Figure 12:
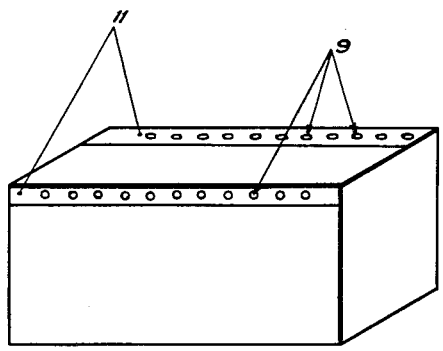

June 19, 1956 P. DEPOIX 2,751,428
ELECTRIC CELL AND BATTERY
Filed March 19, 1952 4 Sheets-Sheet 1
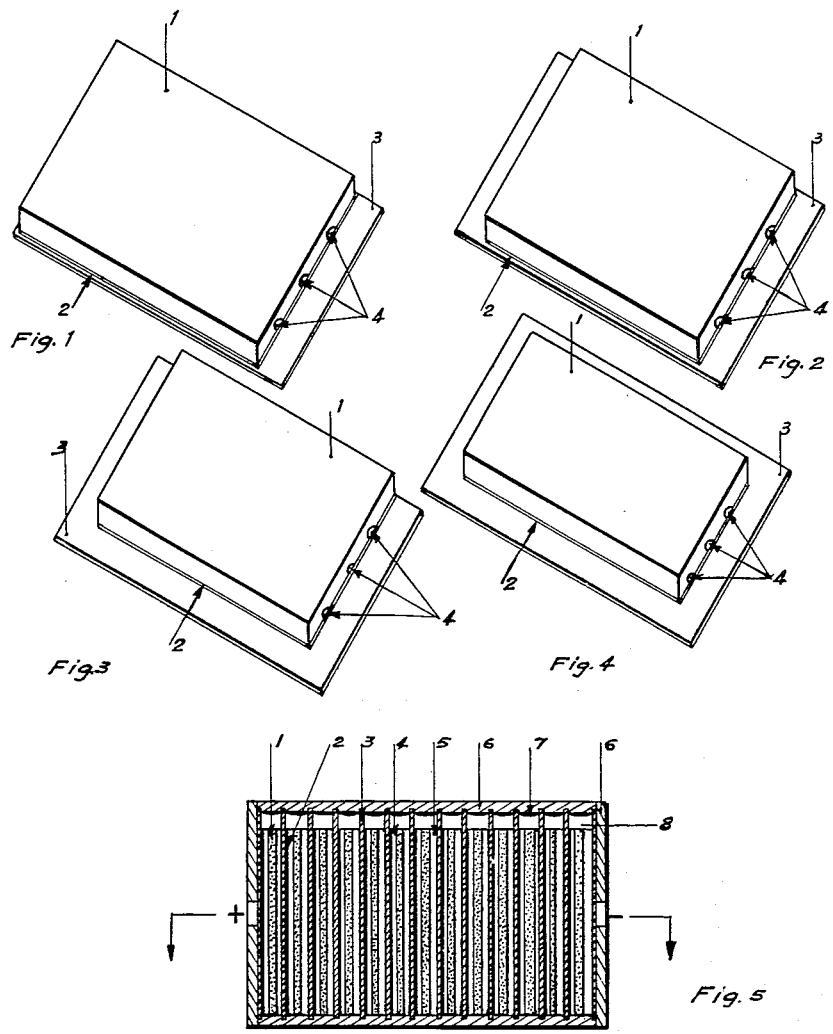
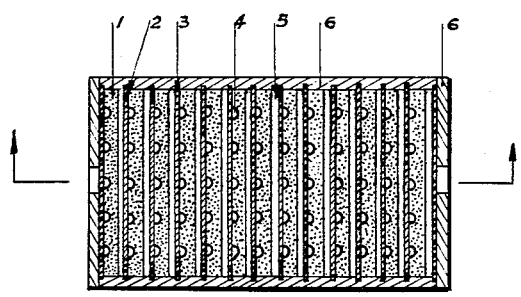
INVENTOR
PIERRE DEPOIX
By Adams + Bush
ATTORNEYS

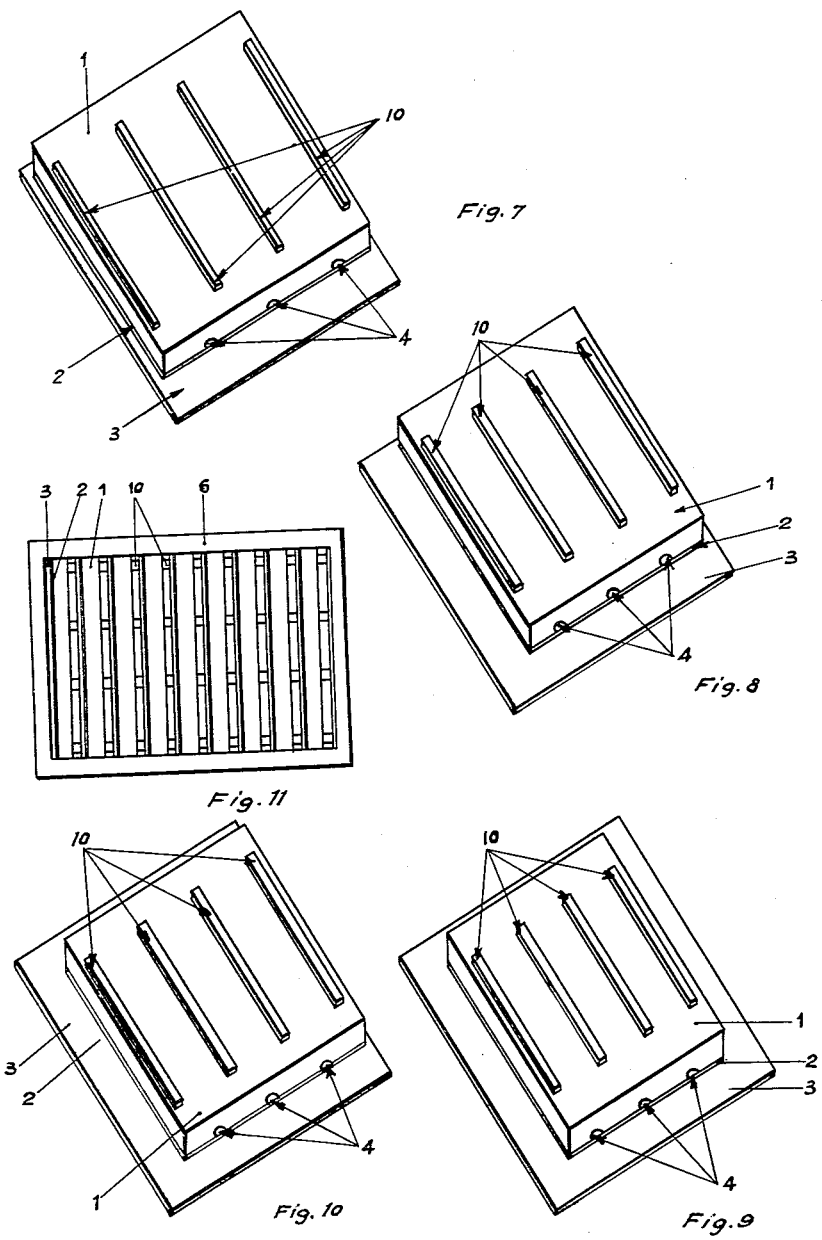

June 19, 1956  P. DEPOIX  2,751,428
ELECTRIC CELL AND BATTERY
Filed March 19, 1952  4 Sheets-Sheet 3

INVENTOR
PIERRE DEPOIX
By Adams & Bush
ATTORNEYS

INVENTOR
PIERRE DEPOIX
By Adams + Bush
ATTORNEYS

The United States Patent Office 2,751,428
Patented June 19, 1956

2,751,428
ELECTRIC CELL AND BATTERY

Pierre Depoix, Chasseneuil-du-Poitou, France, assignor to Societe de la Pile Leclanché, Chasseneuil-du-Poitou, France, a corporation of France Application March 19, 1952, Serial No. 277,360

Claims priority, application France March 23, 1951

6 Claims. (Cl. 136—111)

This invention relates to electric batteries, of inert or dry cells, having flat elements which are depolarised by atmospheric oxygen.

It is known that two shapes of electric elements, are used for the production of batteries or cells, namely so called cylindrical elements, and so called flat elements.

For a long time, cylindrical elements have been almost exclusively manufactured in preference to the flat elements because they alone give satisfaction from the electrical viewpoint and with regard to their useful life and preservation.

More recently, the battery industry has finally succeeded, especially in the case of cells depolarised with manganese dioxide, in manufacturing flat elements having a long useful life and the market for cells having flat elements is commencing to supplant that for cells having cylindrical elements. The advantages of flat elements over cylindrical elements are very numerous:

They permit of almost fully utilising the available space and therefore give a higher capacity for the same volume. It is possible, only with flat elements, to distribute rationally the quantities of zinc and of manganese dioxide which are necessary for affording a given capacity.

The coupling in series is effected by simple stacking without employing connecting wires or welded joints.

The positioning of the flat elements is immaterial, whereas cylindrical elements are preferably stored and used in the vertical position with the head of the positive electrode directed upwardly.

Flat elements permit the provision of cells of relatively high tension and of small volume.

The development of cells having flat elements has benefited by the development of electronics and continues to be related thereto, and it is therefore to be expected that numerous further applications will be found for flat elements in this field.

It is also known that cells in which depolarisation is effected by atmospheric oxygen have advantages as compared with cells in which depolarisation is effected by manganese dioxide. Cells in which depolarisation is effected by air have, in fact a substantially constant utilisation voltage and in well designed cells this voltage has a value such that cells depolarised by air give much greater capacities than those of the same dimensions which are depolarised by manganese dioxide. The preservation of cells depolarised by air is better than that of cells depolarised by manganese dioxide since activated carbon is more stable than manganese dioxide. Finally, for the same dimensions, cells depolarised by the oxygen of the air are much lighter than cells depolarised by manganese dioxide, which is an appreciable advantage in cells for meterorological balloons, portable radio sets, deaf aid equipment and the like.

It is logical to assume from the foregoing that cells consisting of flat elements and depolarised by atmospheric oxygen will have the combined advantages hereinbefore described and will consequently give very satisfactory electrical performance.

Many proposals have been made to manufacture cells consisting of flat elements depolarised by atmospheric oxygen, but the difficulties encountered in the practical application thereof are numerous and, apart from limited constructions, no batteries having flat elements depolarised by air have hitherto been produced on an industrial scale. The main difficulties to be overcome in the assembly of such batteries are the following:

The prevention of short-circuiting of the elements by leakage of the electrolyte between neighbouring elements.

The introduction of sufficient electrolyte into each cell to obtain good characteristics of operation and preservation.

The preservation of a film of paste between the zinc and the separator of the depolarising agglomerate in the course of the stacking of the units for the assembly of the batteries.

The avoidance of the escape of the moisture from each elemental cell while eliminating the gases formed in each cell:

(a) In the course of the discharging of the battery, and (b) In the course of the preservation in the ambient air, even at temperatures of the order of 40° to 50° C. which cells employed in tropical countries must withstand.

The provision of a collective assembly of cells so as to utilise the available space to a maximum.

The production also of the largest possible contact surfaces between the various components of the cells so as to obtain the best possible electrical output from these cells.

The provision of good ventilation for the elements to enable the oxygen of the air to come into contact with the depolariser, while preventing the escape of moisture from the elements as hereinbefore stated.

The various processes which have arisen in the course of recent years for the production of flat elements include some which can be employed both for elements depolarised by manganese dioxide and for elements depolarised by atmospheric oxygen. This is the case, for example, with the methods forming the subject of United States application No. 242,961 filed on August 21, 1951, for "The Manufacture of Electric Cells and Batteries" and of the French patent application No. 595,755, filed on August 24, 1950, for: "Process for the Hermetic Sealing of Dry Cells or Inert Cells Having So Called 'Flat' Elements After Introduction of the Electrolyte."

The present invention concerns particular additional measures specifically applicable to flat elements of the type in which depolarisation is effected by atmospheric oxygen, which measures may be advantageously combined with the method of assembling elements and batteries according to the aforesaid patent applications.

According to the invention there is provided battery of inert or dry cells polarised by the oxygen of the air, each consisting of a pile of flat elements in which the faces of the pile are closed by a waterproof insulating material adhering in fluid-tight fashion to the edges of the elements, wherein the zinc or other negative electrode in each element extends peripherally beyond the depolarising layer so as to fit along its periphery into the waterproof insulating material and to form an expansion and ventilation space for the battery between the elements and the said waterproof insulating material.

Figure 13:
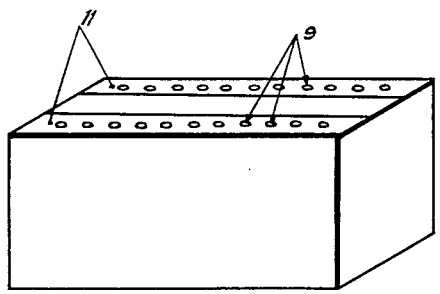
Figure 14:
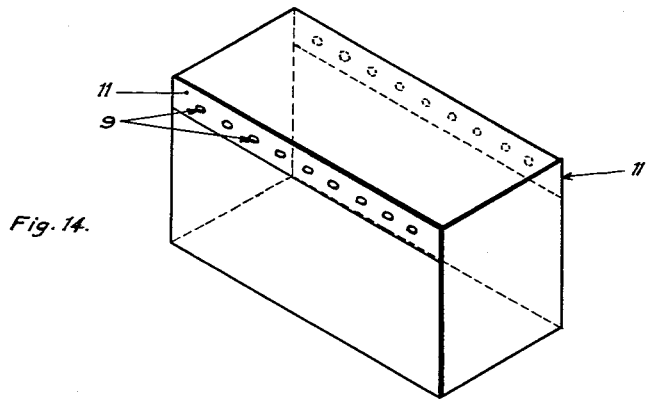
Figure 15:
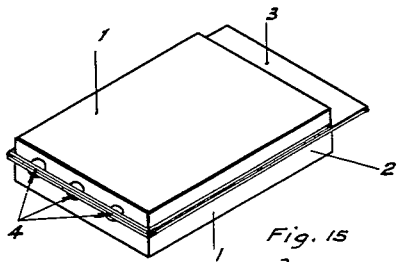
Figure 16:
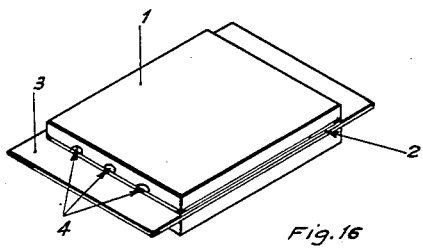
Figure 17:
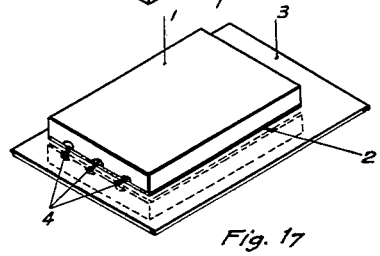
Figure 18:
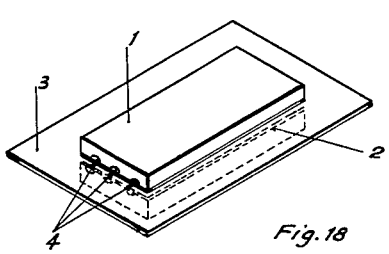
Figure 19:
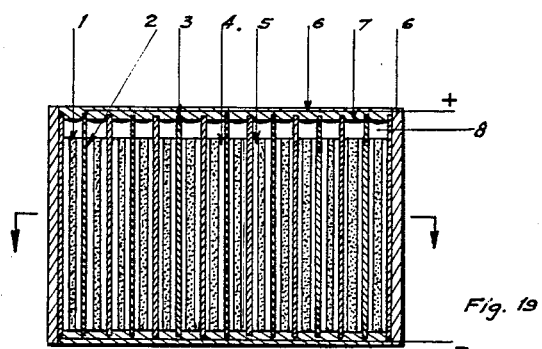
Figure 20:
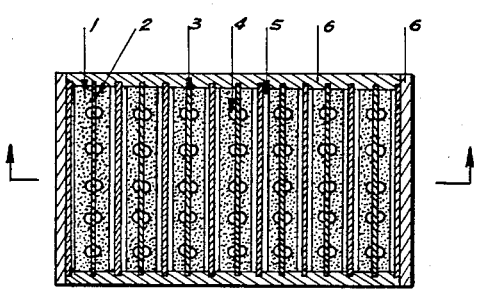

For a better understanding of the invention and to show how the same may be carried into effect, reference will now be made to the accompanying drawings in which:

Figure 1 is a view in perspective of a single bipolar plate, a zinc electrode, an impervious conductive coating and a depolariser having an activated carbon base, Figures 2 to 4 are modifications of Figure 1, Figures 5 and 6 are two longitudinal sections, taken at an angle of 90° to one another, through a series-connected battery, the elements of which comprise bipolar plates according to Figure 1, Figures 7 to 10 are views in perspective of single bipolar plates with separating rods on the free face of the depolariser, Figure 11 is a section through a series-connected battery, the elements of which comprise bipolar plates similar to that of Figure 7, Figures 12 to 14 are views in perspective of complete batteries, Figures 15 to 18 are views in perspective of double bipolar plates, and Figures 19 and 20 are two longitudinal sections, at 90° to one another, through a parallel-connected battery, the elements of which comprise double bipolar plates according to Figure 15.

For the purpose of manufacturing the bipolar plates, a depolarising mixture is first prepared with a base consisting of activated carbon suitably rendered impervious and wetted to permit good compression. This depolarising mixture is spread in a uniform layer of predetermined thickness and ventilation channels are formed in the depolarising mass, for example by placing smooth cylindrical rods on the top of the depolarising mixture and thereafter compressing the whole. A conductive impervious coating is then stuck on the depolariser on the side on which the rods are situated. The rods are withdrawn from the depolariser and the plates obtained are cut to the required size. These plates are dried to permit their subsequent manipulation. After drying, they are each stuck on zinc or other electronegative metal. This sticking may be performed in various ways, as illustrated in Figures 1 to 4, according to whether it is desired to obtain a ventilation chamber on one, two, three or four sides of one element. As illustrated in these figures, 1 is the depolariser in which ventilation holes 4 are formed. The coating 2 is disposed between the depolariser and the zinc 3 or other metal.

The bipolar plates thus formed may be stacked alternately with electrolyte-supporting separators 5, as illustrated in Figures 5 and 6. The electrolyte-supporting separators may also be replaced by rods 10 stable and resistant to the electrolyte to permit the introduction and retention of the electrolytic paste, as illustrated in Figures 7 to 11.

The whole pile is externally varnished with an insulating waterproof varnish, which is thereafter dried. All the faces of the unit are closed by walls 6 of insulating waterproof material which adheres in fluid-tight manner to the plates with the interposition of a product 7 which itself is a waterproof insulator, such as wax, varnish or paste, preferably narrow apertures being formed in one or more faces in the case of inert cells in order to permit of activating them by the introduction of electrolyte, the said apertures then being closed by a very thick adhesive, insulating and waterproof paste or varnish.

It will be obvious from the foregoing that the assembly of the batteries can be carried out by the method covered by the two patent applications hereinbefore referred to. However, in accordance with the invention, an expansion and ventilation space 8 is formed which extends over one or more sides of the piled units, as will be seen from the shape of the bipolar plates shown in Figures 1 to 4 and 7 to 10.

In order to permit the access of external air to such a battery depolarised by the oxygen of the air, the waterproof insulating material 6 has perforations formed therein at the level of this expansion space according to a further feature of the invention.

In a preferred arrangement, each element is provided with a separate expansion chamber, as illustrated in the figures of the drawings, and perforations 9 are provided for each separate chamber. Each battery may thus comprise two longitudinal lines of perforations 9 which may be disposed as shown in Figures 12 to 14 if the piled unit has been prepared with bipolar plates of the type shown in Figure 1. The individual expansion chambers 8 will be localised in the upper part of the battery (Figure 5) and these chambers, into which the ventilation holes 4 lead, will be in communication with the external air through the perforations 9 distributed as required along the face covering the expansion chambers and in the neighborhood of this face on one of the two adjacent faces. In Figure 12, perforations are formed along a longitudinal line in the upper face and another longitudinal line along one of the adjacent faces. In Figure 13, the lines of perforations are in the upper face and in Figure 14 there is a line at the top of each face adjacent the upper face. It is obvious that these arrangements are only described by way of example.

It is also possible to provide one or more collective expansion chambers 8 formed by reducing the height of some or all of the bipolar zinc plates, or by forming holes or recesses in the upper part of these zinc plates.

The number of perforations 9 formed in the insulating waterproof material 6 could consequently be reduced to two in the case of a single collective chamber 8.

However, the problem arises of imparting a long life to the battery in addition to effecting the ventilation, by preventing drying thereof both in storage and during operation. Such drying might be very rapid in hot countries.

To this end, the battery is covered by an envelope comprising at the points where the perforations are situated thin strips of a semi-permeable material which prevents drying of the elements but not the passage of the hydrogen which may be liberated by the elements.

Such semi-permeable materials are already known and include, for example, nitrocellulose, polyvinyl chloride, polythenes, polystyrenes or paper impregnated with a waterproof liquid which absorbs oxygen and hydrogen, such as cresol triphosphate, etc. Two strips 11 of semi-permeable material are shown in Figures 12, 13 and 14.

Protection can most simply be afforded against drying by covering the perforations by a semi-liquid product which, after drying, leaves over each perforation a semi-permeable sealing film. The viscosity of the product must be such that it entirely covers each perforation with a thin continuous layer without running into the perforation. Such a product will be, for example, a solution of polyvinyl chloride and cresol triphosphate in a volatile solvent.

According to another modification, the battery may be covered by an envelope comprising strips in which are formed holes corresponding to the perforations of the insulating waterproof material, the said holes having previously been closed by a product which, on drying, leaves a semi-permeable sealing film over each hole.

Finally, drying can be prevented by covering the battery by an envelope comprising strips in which are formed narrow holes corresponding to the perforations in the insulating waterproof material.

In general, various sealing strips hereinbefore referred to must adhere to the battery, but must be capable of being readily withdrawn by the user, if necessary, when the battery is in use. It is sufficient for this purpose to choose a suitable adhesive.

The various steps which have hereinbefore been described permit of readily ventilating elements formed with bipolar plates of extremely variable size and thickness, that is to say of assembling batteries of cells having very variable dimensions which may range from the very small batteries of cells for deaf aid instruments to large industrial batteries, for example for submarine torpedoes.

In these batteries, the bipolar plates may be connected either in series (Figures 5, 6 and 11) or in parallel, employing an assembly such as the following: zinc, separator, double bipolar plate (Figures 15 to 18), separator, zinc, separator, double bipolar plate, etc., the negative and positive electrodes being connected respectively by at least two longitudinally directed straight connecting wires with the recesses necessary for the electric separation of the polarities. Such a method of connection has been described in the aforesaid United States patent application.

Figures 19 and 20 show in section a parallel-connected battery.

This method of connection affords the possibility of obtaining batteries of high output depolarised by atmospheric.

In general, the new method of manufacture hereinbefore described makes it possible for the first time to provide without difficulty and with the same plant multiple combinations of batteries such as the following:

1. Connection of bipolar plates in a number of series, these series being in turn connected in parallel for the production of high-output high-tension batteries.

2. For batteries comprising a combination of high and low tension, it is possible to employ elements depolarised by manganese dioxide for the low tension unit and elements depolarised by the oxygen of the air for the high-tension unit, or vice-versa.

3. For batteries of this same type, it is possible to employ in one and the same battery different electric couples such as: zinc-manganese dioxide, zinc-carbon, magnesium-cuprous chloride, magnesium-manganese dioxide, etc.

In such combined batteries, it is possible for the first time to effect accurately the desirable balancing of the high-tension and low-tension capacities, which has hitherto been practically impossible.

In tests carried out by the applicants, it has been found that the capacities of batteries of cells depolarised by the oxygen of the air according to the invention are on an average double the capacities of batteries of similar dimensions which are depolarised by manganese dioxide. For certain rates of discharge, this ratio of the capacities may even be greater than 4:1.

The internal resistance of these batteries in which depolarisation is effected by air is very low by reason of their large working and contact surfaces and of their very high short-circuit current. The cost of such batteries, that is to say the cost of the materials necessary for a given capacity, is lower than any minimum cost hitherto achieved.

I claim:

1. A battery structure comprising in combination, an assembly of juxtaposed cells, each cell comprising at least a flat anode of electronegative metal, a flat conductive cathode superimposed on one side of said flat anode, and a depolarizing layer having edge faces and being superimposed on said flat cathode and formed with at least one channel therein traversing the width of said depolarizing layer and opening in an edge face thereof, said flat anode projecting beyond the periphery of said depolarizing layer and said flat cathode at at least part of its periphery adjacent the edge face in which said channel opens; a casing enclosing said assembly of cells having a wall portion connected to the projecting edges of said flat anodes and spaced from the edges of said depolarizing layer and said flat cathode adjacent the opening of said channel, so as to define thereby chambers into which the channel of each depolarizing layer opens, said casing wall portion being formed with vent apertures communicating with the atmosphere and opening into said chambers; and filtering means covering said vent apertures in said casing wall portion being permeable to gas and impermeable to liquids for retaining moisture within said cells while allowing passage of gases therethrough.

2. A battery structure comprising in combination, an assembly of juxtaposed cells, each cell comprising at least a flat anode of electronegative metal, a flat conductive cathode superimposed on one side of said flat anode, and a depolarizing layer having edge faces and being superimposed on said flat cathode and formed with at least one channel therein traversing the width of said depolarizing layer and opening in an edge face thereof, said flat anode projecting beyond the periphery of said depolarizing layer and said flat cathode at at least part of its periphery adjacent the edge face in which said channel opens; a casing enclosing said assembly of cells having a wall portion connected to the projecting edges of said flat anodes and spaced from the edges of said depolarizing layer and said flat cathode adjacent the opening of said channel, so as to define thereby chambers into which the channel of each depolarizing layer opens, said casing wall portion being formed with vent apertures communicating with the atmosphere and opening into said chambers; and filtering means covering said vent apertures in said casing wall portion, said filtering means including strips of material permeable to gas and impermeable to liquids for retaining moisture within said cells while allowing passage of gas therethrough.

3. A battery structure comprising, in combination, an assembly of juxtaposed cells, each cell comprising at least a flat anode of electronegative metal, a flat conductive cathode superimposed on one side of said flat anode, and a depolarizing layer having edge faces and being superimposed on said flat cathode and formed with at least one channel therein traversing the width of said depolarizing layer and opening in an edge face thereof, said flat anode projecting beyond the periphery of said depolarizing layer and said flat cathode at at least part of its periphery adjacent the edge face in which said channel opens; a casing enclosing said assembly of cells having a wall portion connected to the projecting edges of said flat anodes and spaced from the edges of said depolarizing layer and said flat cathode adjacent the opening of said channel, so as to define thereby chambers into which the channel of each depolarizing layer opens, said casing wall portion being formed with vent apertures communicating with the atmosphere and opening into said chambers; and initially semi-liquid filtering means covering said vent apertures in said casing wall portion, said semi-liquid means, upon drying, forming a material being permeable to gas and impermeable to liquids for retaining moisture within said cells while allowing passage of gas therethrough.

4. A battery structure comprising, in combination, an assembly of juxtaposed cells, each cell comprising at least a flat anode of electronegative metal, a flat conductive cathode superimposed on one side of said flat anode, and a depolarizing layer having edge faces and being superimposed on said flat cathode and formed with at least one channel therein traversing the width of said depolarizing layer and opening in an edge face thereof, said flat anode projecting beyond the periphery of said depolarizing layer and said flat cathode at at least part of its periphery adjacent the edge face in which said channel opens; a casing enclosing said assembly of cells having a wall portion connected to the projecting edges of said flat anodes and spaced from the edges of said depolarizing layer and said flat cathode adjacent the opening of said channel, so as to define thereby chambers into which the channel of each depolarizing layer opens, said casing wall portion being formed with vent apertures communicating with the atmosphere and opening into said chambers; sealing means enclosing said casing and having openings therein corresponding to said vent apertures formed in said casing wall portion for communicating with the same; and filtering means mounted in said openings in said sealing means and completely covering the same, said filtering means being permeable to gas and impermeable to liquids for retaining moisture within said sealing means while allowing the passage of gas through said vent apertures in said casing wall portion.

5. A battery structure comprising, in combination, an assembly of juxtaposed cells, each cell comprising at least a flat anode of electronegative metal, a flat conductive cathode superimposed on one side of said flat anode, and a depolarizing layer having edge faces and being superimposed on said flat cathode and formed with at least one channel therein traversing the width of said depolarizing layer and opening in an edge face thereof, said flat anode projecting beyond the periphery of said depolarizing layer and said flat cathode at at least part of its periphery adjacent the edge face in which said channel opens; a casing enclosing said assembly of cells having a wall portion connected to some of the projecting edges of said flat anodes and spaced from the projecting edges of the remaining flat anodes and the edges of said depolarizing layer and said flat cathode adjacent the opening of said channel, so as to define thereby chambers into which the channel of each depolarizing layer opens, said casing wall portion being formed with vent apertures communicating with the atmosphere and opening into said chambers; and filtering means covering said vent apertures in said casing wall portion being permeable to gas and impermeable to liquids for retaining moisture within said cells while allowing passage of gases therethrough.

6. A battery structure comprising, in combination, an assembly of juxtaposed cells, each cell comprising at least a flat anode of electronegative metal, a flat conductive cathode superimposed on one side of said flat anode, and a depolarizing layer having edge faces and being superimposed on said flat cathode and formed with at least one channel therein traversing the width of said depolarizing layer and opening in an edge face thereof, said flat anode projecting beyond the periphery of said depolarizing layer and said flat cathode at at least part of its periphery adjacent the edge face in which said channel opens; a casing enclosing said assembly of cells having a wall portion spaced from the projecting edges of the flat anodes and the edges of said depolarizing layer and said flat cathode adjacent the opening of said channel, so as to define thereby a common chamber into which the channel of each depolarizing layer opens, said casing wall portion being formed with vent apertures communicating with the atmosphere and opening into said chamber; and filtering means covering said vent apertures in said casing wall portion being permeable to gas and impermeable to liquids for retaining moisture within said cells while allowing passage of gases therethrough.

References Cited in the file of this patent

UNITED STATES PATENTS

| | | |
|---|---|---|
| 480,384 | Dow | Aug. 9, 1892 |
| 1,607,759 | Keller | Nov. 23, 1926 |
| 1,640,039 | Keller | Aug. 23, 1927 |
| 1,916,709 | Zimmerman | Oct. 1, 1927 |
| 1,821,008 | Dittrick et al. | Sept. 1, 1931 |
| 1,890,178 | Heise et al. | Dec. 6, 1932 |
| 1,916,709 | Zimmerman | July 4, 1933 |
| 2,074,506 | Heise | Mar. 23, 1937 |
| 2,636,061 | Baldwin | Apr. 21, 1953 |

FOREIGN PATENTS

| | | |
|---|---|---|
| 15,371 | Great Britain | Nov. 23, 1895 |
| 668,569 | France | July 15, 1929 |